United States Patent
Sapena Soler

(10) Patent No.: US 9,917,801 B2
(45) Date of Patent: Mar. 13, 2018

(54) METHOD FOR THE REGISTRATION AND CERTIFICATION OF RECEIPT OF ELECTRONIC MAIL

(71) Applicant: Lleidanetworks Serveis Telemàtics S.A., Lleida (ES)

(72) Inventor: Francisco Sapena Soler, Lleida (ES)

(73) Assignee: Lleidanetworks Serveis Telematics S.A., Lleida (ES)

( * ) Notice: Subject to any disclaimer, the term of this patent is extended or adjusted under 35 U.S.C. 154(b) by 272 days.

(21) Appl. No.: 13/678,447

(22) Filed: Nov. 15, 2012

(65) Prior Publication Data

US 2014/0115073 A1    Apr. 24, 2014

(30) Foreign Application Priority Data

Oct. 19, 2012 (EP) .................................. 12382407

(51) Int. Cl.
*H04L 12/58* (2006.01)
(52) U.S. Cl.
CPC .............. *H04L 51/04* (2013.01); *H04L 51/34* (2013.01); *H04L 51/30* (2013.01)
(58) Field of Classification Search
CPC ........ G06F 15/16; G06F 15/173; G06F 11/30; G06F 17/30; H04L 9/00; H04L 9/30; H04L 29/06551; H04L 29/06578; H04L 29/06585; H04L 29/06755; H04L 41/00; H04L 41/50; H04L 51/00; H04L 51/02; H04L 51/22; H04L 51/30; H04L 51/34; H04L 51/04
USPC .................. 713/170, 176, 201; 709/201–206
See application file for complete search history.

(56) References Cited

U.S. PATENT DOCUMENTS

| | | | | |
|---|---|---|---|---|
| 5,109,384 A | * | 4/1992 | Tseung ........................ | 714/748 |
| 5,530,855 A | * | 6/1996 | Satoh et al. ................. | 707/648 |
| 5,613,106 A | * | 3/1997 | Thurman et al. ............ | 707/648 |
| 5,678,191 A | * | 10/1997 | Eaton et al. ................ | 340/7.22 |

(Continued)

FOREIGN PATENT DOCUMENTS

| | | |
|---|---|---|
| JP | 2004080134 A | 10/2004 |
| JP | 2007140760 A | 12/2008 |

(Continued)

OTHER PUBLICATIONS

International Search Report issued in PCT/EP2013/071817 dated Dec. 12, 2013.

(Continued)

*Primary Examiner* — Arvin Eskandarnia
*Assistant Examiner* — Boris Grijalva Lobos
(74) *Attorney, Agent, or Firm* — Blank Rome LLP

(57) ABSTRACT

The object of the invention is a method to receive e-mail from any transmitting user in a specific e-mail address, generating proof of all the operation transactions to deliver a certificate to the transmitting user as a trusted third party of the sending and delivery of an e-mail, indicating the content and the attachments, by the steps of reception in a mail server, sending of a copy to the recipient, its itemization in a database and its registration in the client register and database, where finally a data processing unit creates an electronic receipt with the transactional data, the data sent, the attachments and it digitally signs it creating the certificate that it sends to the initial user.

14 Claims, 3 Drawing Sheets

(56) References Cited

U.S. PATENT DOCUMENTS

| | | | | |
|---|---|---|---|---|
| 6,058,378 | A * | 5/2000 | Clark et al. | 705/37 |
| 6,182,219 | B1 * | 1/2001 | Feldbau et al. | 713/176 |
| 6,226,651 | B1 * | 5/2001 | Masuda et al. | |
| 6,314,454 | B1 * | 11/2001 | Wang et al. | 709/206 |
| 7,389,238 | B2 * | 6/2008 | Sansone et al. | 705/1.1 |
| 7,822,820 | B2 * | 10/2010 | LeVasseur et al. | 709/206 |
| 7,904,360 | B2 * | 3/2011 | Evans | 705/35 |
| 7,966,372 | B1 * | 6/2011 | Tomkow | 709/206 |
| 8,667,069 | B1 * | 3/2014 | Connelly et al. | 709/206 |
| 2001/0027523 | A1 * | 10/2001 | Wakino | 713/200 |
| 2002/0046250 | A1 * | 4/2002 | Nassiri | 709/206 |
| 2002/0059144 | A1 * | 5/2002 | Meffert et al. | 705/51 |
| 2002/0087646 | A1 * | 7/2002 | Hickey et al. | 709/206 |
| 2002/0090069 | A1 * | 7/2002 | Yaker | 379/88.17 |
| 2002/0143710 | A1 * | 10/2002 | Liu | 705/75 |
| 2002/0144154 | A1 * | 10/2002 | Tomkow | 713/201 |
| 2002/0174185 | A1 * | 11/2002 | Rawat et al. | 709/206 |
| 2003/0061176 | A1 * | 3/2003 | Hoar | 705/402 |
| 2004/0083365 | A1 * | 4/2004 | Renier et al. | 713/168 |
| 2004/0143650 | A1 | 7/2004 | Wollowitz | |
| 2004/0202294 | A1 | 10/2004 | Gardner | |
| 2004/0230657 | A1 * | 11/2004 | Tomkow | 709/206 |
| 2005/0033958 | A1 * | 2/2005 | Connell | 713/156 |
| 2005/0102499 | A1 * | 5/2005 | Kosuga et al. | 713/152 |
| 2005/0188077 | A1 * | 8/2005 | Quintanilla et al. | 709/224 |
| 2006/0080533 | A1 * | 4/2006 | Bradbury | 713/170 |
| 2007/0011252 | A1 * | 1/2007 | Taylor | 709/206 |
| 2007/0043950 | A1 * | 2/2007 | Imanishi et al. | 713/176 |
| 2007/0073817 | A1 | 3/2007 | Gorty | |
| 2007/0130329 | A1 * | 6/2007 | Shah | 709/224 |
| 2007/0174402 | A1 | 7/2007 | Tomkow | |
| 2008/0086532 | A1 * | 4/2008 | Cunningham | 709/206 |
| 2008/0278740 | A1 * | 11/2008 | Bird et al. | 358/1.15 |
| 2008/0285756 | A1 * | 11/2008 | Chuprov et al. | 380/277 |
| 2009/0177673 | A1 * | 7/2009 | Cunningham | 707/100 |
| 2012/0110322 | A1 * | 5/2012 | Slepinin et al. | 713/152 |
| 2012/0123919 | A1 * | 5/2012 | Li et al. | 705/34 |
| 2012/0284347 | A1 * | 11/2012 | Cohen et al. | 709/206 |
| 2013/0218989 | A1 * | 8/2013 | Sapena Soler | 709/206 |
| 2013/0218990 | A1 * | 8/2013 | Sapena Soler | 709/206 |

FOREIGN PATENT DOCUMENTS

| | | |
|---|---|---|
| JP | 2009135962 A | 12/2010 |
| WO | 2014060569 A1 | 4/2014 |

OTHER PUBLICATIONS

Australia Office Action dated Jul. 22, 2016; Application No. 201333308; 4 pages.
Chile Office Action dated Apr. 13, 2016; Application No. 947-15; 6 pages.
Colombia Office Action dated Sep. 5, 2016; Application No. 15113684; 11 pages.
GCC Office Action dated Dec. 4, 2016; Application No. GC2013-25568; 3 pages.
Japan Office Action dated Feb. 7, 2017; Application No. 2015-537274; 3 pages.
English translation; Japanese Application No. JP2009135962; Filing Date: Jun. 5, 2009; 37 pages.
English translation; Japanese Application No. JP2004080134; Filing Date: Mar. 19, 2004; 16 pages.
English translation; Japanese Application No. JP2007140760; Filing Date: May 28, 2007; 19 pages.
Mexico Office Action dated Mar. 2, 2017; Application No. 17715; 4 pages.
New Zealand Office Action dated Sep. 25, 2017; Application No. 707300; 3 pages.
Russia Office Action dated Sep. 15, 2017; Application No. 2015114099/08; 5 pages.
Taiwan Office Action dated Apr. 14, 2016; Application No. 102137623; 4 pages.
English translation; Chile Office Action dated Apr. 13, 2016; Application No. 947-15; 7 pages.
English translation; Colombia Office Action dated Sep. 5, 2016; Application No. 15113684; 10 pages.
English translation; China Office Action; Application No. 201380054576X; 5 pages.
English translation; Mexico Office Action dated Mar. 2, 2017; Application No. 17715; 3 pages.
English translation; Russia Office Action dated Sep. 15, 2017; Application No. 2015114099/08; 5 pages.

* cited by examiner

METHOD FOR THE REGISTRATION AND CERTIFICATION OF RECEIPT OF ELECTRONIC MAIL

This application claims priority to European Patent Application No. EP 12382407, filed Oct. 19, 2012, the contents of which are hereby incorporated by reference.

OBJECT OF THE INVENTION

The object of the invention is a method so that a telecommunications operator can receive, reroute, and deliver e-mail from any transmitting user that is not a client of the telecommunications operator to one or several client recipients of the telecommunications operator, generating proof of all the operation transactions to, finally, sign it digitally and deliver a certificate to the non-client issuer users as telecommunications operator and trusted third party, also generating an incoming register of the e-mails received.

BACKGROUND OF THE INVENTION

It is known that current electronic communications have become a vital and essential tool for any operations, both legal and illegal. The communications are used for all kind of movements, generating calls, e-mails, etc. from a source to a destination.

Telecommunications operators provide the infrastructures that manage, direct and store a large part of this traffic. These telecommunications operators are subject to regulation, among others, for the use of the radio spectrum, which is limited, or for the use of telephone number resources, which are also finite.

Telecommunications operators also make recordings of the operations that the users make with the objectives, among others, of pricing, recording the numbers associated thereto, billing references, as well as the recording of any transactional detail used in the billing of the user. These recordings are kept for later verifications of pricing and/or monitoring of the traffic by the user.

On occasions, the legal authorities request the telecommunications operators for recorded data of the electronic transactions carried out, since they are considered as trusted third parties for the purposes of providing these data, as well as any other detail that may help to determine the individuals or corporate bodies who have performed the action of interest.

However, the search for the data requested from the telecommunications operator is normally complicated, since it is performed in recordings of activities with a large volume, normally designed for billing rather than monitoring data traceability. Therefore, the previous search for the data requested may take up a huge amount of the telecommunications operator's resources.

Once the data have been located by the legal authorities, the telecommunications operator issues a certificate wherein it explicitly states the transactional data requested, the frequency, the destinations, as well as any information the appropriate legal authority may have requested.

Likewise, in the users or bodies that receive e-mails there is the need to generate a certified register of all the transactions or e-mails received, and in turn, issue a legally valid certificate to the issuers of the original e-mail and certify the transaction data, for example, the data transmitted, the date, the attachments, the reception date or any other detail useful for the user. This need may be due to a third party request to the generating user of the previous transactional data.

Various methods and systems are known in the state of the art to verify the transmission as well as the integrity of the data contained in an e-mail. These known methods normally provide proof and contents of the sending and reception of e-mails based on a technological solution that enables verifying the transmission.

However, the methods known in the state of the art have the disadvantage that they need the e-mail content and attachments to follow a template or scheme predetermined in a previous document, preventing versions, modifications or simply a free template in the document to be received.

The methods known in the state of the art for recording the entry of documentation by users or bodies have several drawbacks, such as the non-automation of the process and the need for human intervention, which leads to a high consumption time and they also have a high labour cost.

The invention object of this application provides a solution to the previously commented disadvantages by a simple certification method that includes the transmission data, the data transmitted, the attachments, a unique register number and the data of the final status of the transmission.

DESCRIPTION OF THE INVENTION

The present invention resolves the previous drawbacks by a method whereby a telecommunications operator can create a record of e-mails received by a client of the telecommunications operator and in turn certify the reception of the text delivered with all its attachments to the issuer of that e-mail, so that the issuer obtains proof of the delivery of an e-mail together with the transmission data, the data transmitted, the attachments, a unique register number and the final status of the transmission.

The method for recording and certifying the reception of e-mail from an transmitting user to a recipient user object of the invention comprises the following steps that are performed in an e-mail reception and certification system comprising at least one incoming mail server, at least one outgoing mail server, at least one database, a time stamp server, a data processing unit and a certification server which are interconnected:

reception in the incoming mail server of an e-mail issued by an transmitting user;

forwarding in flat mode of the mail without modifications to a recipient user for its filing;

insertion and recording in a database of a telecommunications operator of the text and the components received of the e-mail issued by the transmitting user;

creation in the data processing unit of an electronic receipt comprising at least data of the recipient user, the issue date, the reception date, the content, the attached data and notification data regarding the reception of the mail without modifications forwarded to the recipient user;

application in the certification server of a digital signature algorithm to the electronic receipt for the creation of a certificate;

sending of the certificate to the transmitting user through the outgoing mail server.

According to the above, the method object of the invention has the advantage that any content which can be sent by e-mail can be delivered, generating proof of reception of the content.

DESCRIPTION OF THE DRAWINGS

To complement the description being made and in order to aid towards a better understanding of the characteristics of the invention, according to a preferred example of practical embodiment thereof, a set of drawings is attached as an integral part of said description wherein, with illustrative and non-limiting nature, the following has been represented.

PREFERRED EMBODIMENT OF THE INVENTION

Figure 1:
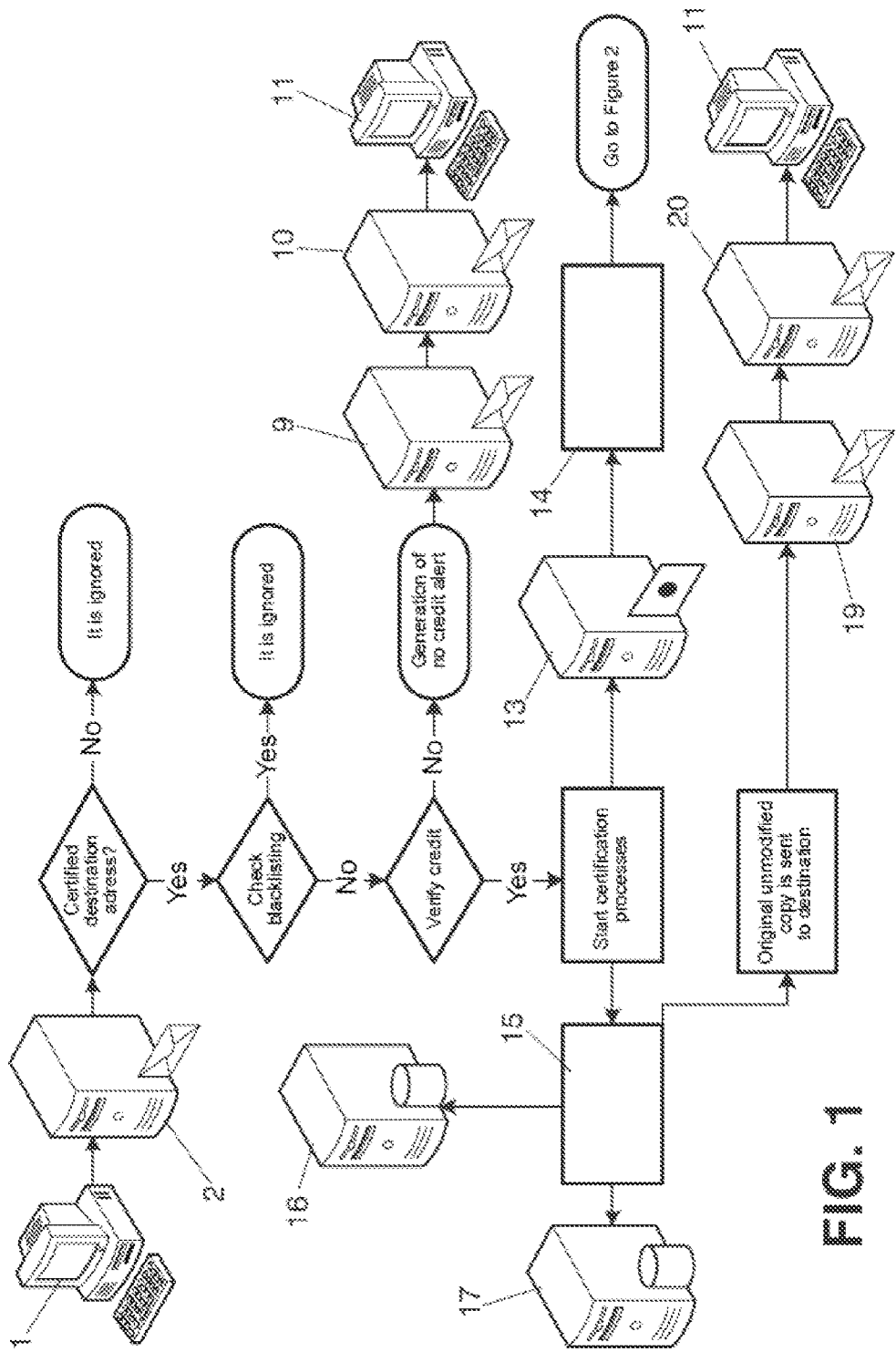
FIGS. 1 and 2.—Show a flow diagram of an example of embodiment of the method object of the invention and of the creation of the digital certificate.
Figure 2:
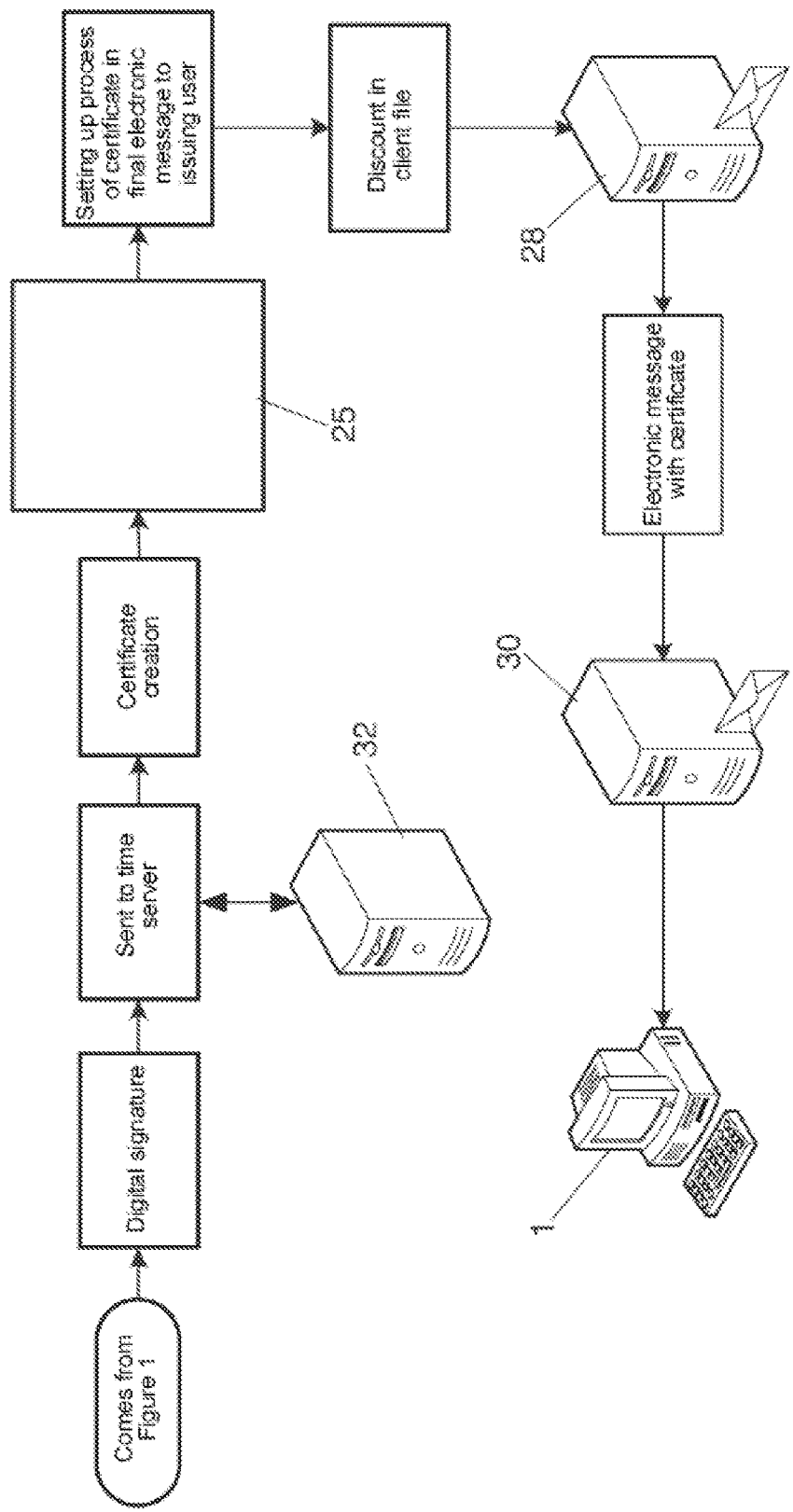

FIGS. 1 and 2 show an example of embodiment of the method of recording and certifying incoming e-mail object of the invention comprising the sending of an e-mail from an transmitting user (1) to the reception of the certificate (25) by this transmitting user (1).

The transmitting user (1), which is not a client of the telecommunications operator, sends the e-mail to a destination address, this address being the address of a recipient user (11), who is client of the telecommunications operator, where the recipient user (11) would like to certify the incoming e-mails to a specific address.

When the e-mail reaches the incoming mail server (2), the incoming mail server (2) verifies if the e-mail comprises an e-mail address to be certified and if it is found in a certification window. If it does not correspond to an address to be certified, the e-mail is ignored. If it corresponds to a correct address, it passes to a filter which determines if it is junk mail or the transmitting user belongs to the blacklist. If the filter determines that it is junk mail, it is discarded; otherwise, it is then verified if the recipient user (2) has credit for the certification of the incoming e-mail.

If there is no balance or credit, a lack of credit alert is generated, which is sent to a first outgoing mail server (9). This server processes the e-mail and delivers it to a first mail server (10) of the recipient user (11), which is responsible for the accounts management so that it makes effective the credit availability that can allow the certification.

If the recipient user (11) has balance, the system starts the certification process of the incoming mail, first passing to a data processing unit (15) which will disintegrate the e-mail in all its components, it will generate unique numbering and will insert it in a database (17) present in the telecommunications operator in addition to in a remote database (16) of the recipient user (11), this (11) being able to work with its own copy in a separate server. Likewise, a copy of the original e-mail without modifications is sent to the destination, i.e. to the recipient user (11), specifically to a second mail server (20) of the recipient user (11) through a second outgoing mail server (19).

Once these steps have been verified, the certification server (13) is notified, which creates a file (14) with the traceability data of the e-mail, sources, servers it has passed through, the non-printable attachments, the printable attachments and it signs said file (14) with the digital signature of the telecommunications operator.

Later, the digital addition is performed of the content of the file (14) through a time stamp server (32) to later create the certificate (25), preferably in .pdf format with all the details of the operations performed.

Once the certificate (25) has been created an e-mail is attached to be delivered to the transmitting user (1), it discounts the amount of the certificate (25) from the content balance in the file of the recipient user (11) and passes the mail to a server of outgoing certified mails (28) of the telecommunications operator.

This e-mail contains the certificate (25) which is sent to the mail server (30) of the transmitting user (1) so that on its reception, it (1) has a certificate (25) which proves that its address one day sent an e-mail with data and attachments to a certain destination and with specific contents.

Figure 3:
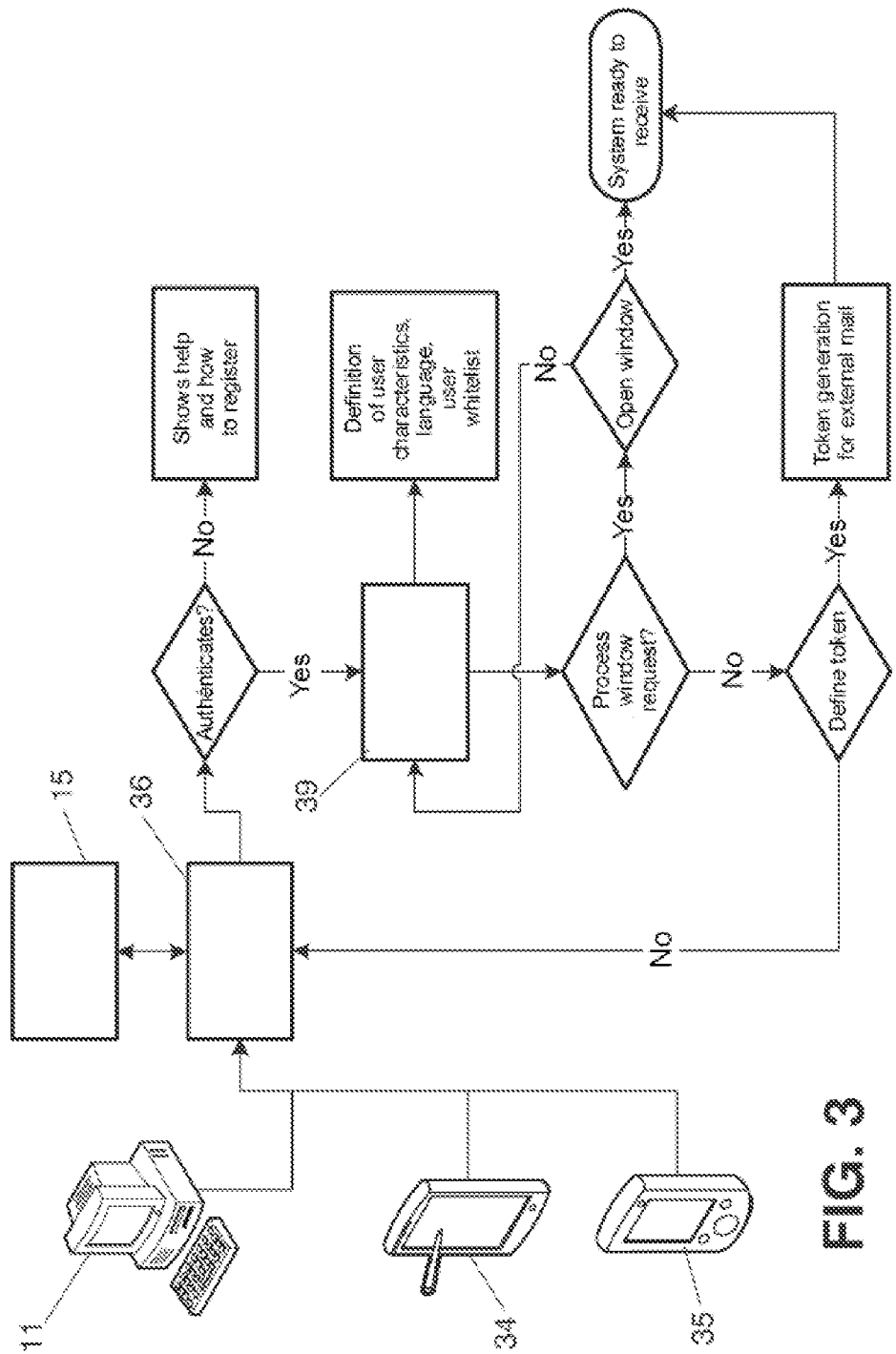
FIG. 3.—Shows a flow diagram of an example of embodiment of the authentication method of a recipient user.

FIG. 3 represents an example of an embodiment of a prior step wherein the recipient user (11) starts the connection with the data processing unit (15) of the telecommunications operator, of which it is a client.

This recipient user (11) starts the connection with different access systems, for example, a PC, an electronic tablet (34), a Smartphone (35) or any device which allows users to navigate through Internet.

In the example of the embodiment shown, each recipient user (11) accesses an access control web system (36). This system has access to a database containing the files of the recipient users (11) with certification capacity and the number of certifications they have available as well as of its operating capacity.

The recipient user (11) enters the username and password to carry out authentication. If this is not correct, the user is redirected and shown system help, which explains to the user how to register to again perform his authentication.

If the recipient user (11) is correctly authenticated, the user can access a menu (39) where it is possible to specify the characteristics of how the user wants the certificate (25) to be issued or from what addresses it is permitted to carry out the certification of the e-mails. Once these parameters have been defined, the recipient user (11) can request a certification process window and adjust its timetable. In other words, from a certain time it gives authorization to the certification system so that e-mails enter and start the certification process.

Finally, if when the certification process starts, the recipient user (11) is in the mail delivery window, the certification process will continue. Otherwise, the e-mail is returned with a message indicating that it is outside the window or it is from an unknown transmitting user (1).

As an alternative, the recipient user (11) may request an encrypted token to perform the certification requests without the need for opening a window via the web.

The invention claimed is:

1. A method for recording and certifying the reception of e-mail from a transmitting user to a recipient user in an email reception and certification system of a telecommunications operator, the certification system comprising at least one incoming mail server, at least one outgoing mail server, at least one database, a time stamp server, a data processing unit, and a certification server which are interconnected, the method comprising:

a transmitting user, which is not a client of the telecommunications operator, sending the e-mail to a destination address, this address being the address of a recipient user, who is a client of the telecommunications operator, reception, by the at least one incoming mail server, of the e-mail issued by the transmitting user;

passing the e-mail to the data processing unit which:
disintegrates the e-mail into components,
generates a unique numbering, and
inserts the unique numbering in a database present in the telecommunications operator, in addition to in a remote database of the recipient user;

sending a copy of the e-mail without modifications to the recipient user, specifically to a second mail server of the recipient user through a second outgoing mail server;

notifying the certification server which creates a file with traceability data of the e-mail, and signs the file with the digital signature of the telecommunications operator;

performing a digital addition of content of the file through a time stamp server;

creating a electronic receipt with details of operations performed;

application, by the certification server, of a digital signature algorithm to the electronic receipt for creation of a certificate;

delivering the certificate to a transmitting server of outgoing certified e-mails of the telecommunications operator; and receiving the certificate from the server of outgoing certified mails of the telecommunications operator in a server of the transmitting user.

2. The method for recording and certifying the reception of e-mail, according to claim 1, wherein after the step of reception in the incoming mail server of the email issued by the transmitting user, the incoming mail server verifies that the e-mail comprises an e-mail address to be certified and that the e-mail address is found in a certification window.

3. The method for recording and certifying the reception of e-mail, according to claim 2, wherein if the incoming mail server verifies that the e-mail comprises the e-mail address to be certified and that the e-mail address is found in the certification window, the e-mail passes to a filter which determines if the e-mail is junk or the transmitting user belongs to a blacklist.

4. The method for recording and certifying the reception of e-mail, according to claim 2, wherein if the incoming mail server verifies that the e-mail does not comprise the e-mail address to be certified or that the e-mail address is not found in the certification window the incoming mail server ignores the e-mail.

5. The method for recording and certifying the reception of e-mail, according to claim 3, wherein if the filter determines that the e-mail is not junk mail or the transmitting user does not belong to the blacklist the filter verifies if the recipient user has credit for the certification of the incoming e-mail.

6. The method for recording and certifying the reception of e-mail, according to claim 5, wherein if the recipient user does not have credit for the certification of the incoming e-mail a lack of credit alert is generated, which alert is sent to a first outgoing mail server, which processes the e-mail and delivers the e-mail to a first mail server of the recipient user which is in charge of the accounts management so that the first mail server makes effective the credit availability that can allow the certification.

7. The method for recording and certifying the reception of e-mail, according to claim 5, wherein if the recipient user has credit for the certification of the incoming e-mail the system starts the certification process of the incoming mail, first passing to a data processing unit which will disintegrate the e-mail into its components, generate a unique number, and will insert the unique number in a database present in the telecommunications operator in addition to in a remote database of the recipient user.

8. The method for recording and certifying the reception of e-mail, according to claim 1, wherein in the step of application in the certification server of a digital signature algorithm to the electronic receipt for the creation of a certificate, the certification server creates a file with the traceability data of the e-mail, sources, servers it has passed through, the non-printable attachments, the printable attachments, and it signs said file with the digital signature of the telecommunications operator.

9. The method for recording and certifying the reception of e-mail, according to claim 8, wherein before creating the certificate, the digital addition of the file content is performed through a time stamp server.

10. The method for recording and certifying the reception of e-mail, according to claim 1, wherein prior to the reception, by the incoming mail server, of the e-mail, the recipient user starts the connection with the data processing unit of the telecommunications operator.

11. The method for recording and certifying the reception of e-mail, according to claim 10, wherein the recipient user starts the connection with different access systems, including any of a PC, an electronic tablet, a Smartphone, or a device which allows you to navigate through Internet.

12. The method for recording and certifying the reception of e-mail, according to claim 11, wherein the recipient user accesses an access control web system which has access to a database containing the files of the recipient users with certification capacity and the number of certifications that they have available as well as of their operating capacity, where the recipient user introduces a username and a password to perform authentication.

13. The method for recording and certifying the reception of e-mail, according to claim 12, wherein if the recipient user is correctly authenticated, he can access a menu to specify the characteristics of how the user wants the certificate to be issued or from what addresses certification of the e-mails is permitted to be carried out, request a certification process window and adjust a timetable of the certification process, so that the certification process window authorizes the certification system so that emails enter and the certification process starts.

14. The method for recording and certifying the reception of e-mail, according to claim 12, wherein the recipient user requests an encrypted token to carry out the certification requests without the need for opening a window via the web.

\* \* \* \* \*